(12) United States Patent  (10) Patent No.: US 7,766,602 B1
Stroburg  (45) Date of Patent: Aug. 3, 2010

(54) WINDMILL WITH PIVOTING BLADES

(76) Inventor: Eldon L. Stroburg, 613 King, Blockton, IA (US) 50836

( * ) Notice: Subject to any disclaimer, the term of this patent is extended or adjusted under 35 U.S.C. 154(b) by 0 days.

(21) Appl. No.: 11/955,494

(22) Filed: Dec. 13, 2007

(51) Int. Cl.
*F03D 7/06* (2006.01)
(52) U.S. Cl. .......................... 415/4.2; 416/111
(58) Field of Classification Search ................ 415/4.2; 416/110, 111, 136, 132 B; 417/328; 290/55
See application file for complete search history.

(56) References Cited

U.S. PATENT DOCUMENTS

| | | | | |
|---|---|---|---|---|
| 1,618,549 | A * | 2/1927 | O'Toole | 416/111 |
| 1,875,570 | A | 9/1932 | Dean | |
| 2,603,300 | A * | 7/1952 | King | 416/10 |
| 3,005,496 | A * | 10/1961 | Nichols | 416/41 |
| 4,168,439 | A | 9/1979 | Palma | |
| 4,204,805 | A | 5/1980 | Bolie | |
| 4,247,251 | A * | 1/1981 | Wuenscher | 416/24 |
| 4,334,823 | A | 6/1982 | Sharp | |
| 4,452,568 | A | 6/1984 | Andersson | |
| 4,609,827 | A | 9/1986 | Nepple | |
| 4,678,394 | A * | 7/1987 | Willoughby | 415/141 |
| 5,133,637 | A | 7/1992 | Wadsworth | |
| 5,518,367 | A | 5/1996 | Verastegui | |
| 6,652,232 | B2 | 11/2003 | Bolduc | |
| 6,979,170 | B2 | 12/2005 | Dery et al. | |
| 7,040,859 | B2 | 5/2006 | Kane | |

OTHER PUBLICATIONS

Kim, S.J., et al., "Efficiency Improvement of Cycloidal Wind Turbine by Active Control of Blade Motions", School of Mechanical and Aerospace Engineering, Seoul National University (9 pages).
Leno, Jay, "Blowin' in the Wind", Jay's Green Garage, Popular Mechanics, p. 46 (Sep. 2007).
Green Tech, "Going With the Wind", How 2.0, Popular SCience, p. 94 (Aug. 2007).
"Darrieus wind turbine", from Wikipedia, http://en/wikipedia.org/wiki/Darrieus_wind_turbine (3 pages). printed Oct. 18, 2007.
Eggleston, E., "What are Vertical-Axis Wind Turbines (VAWTs)", http://www.awea.org/faq/vawt.html. 2 pages. printed Oct. 18, 2007.

(Continued)

*Primary Examiner*—Edward Look
*Assistant Examiner*—Dwayne J White
(74) *Attorney, Agent, or Firm*—McKee, Voorhees & Sease, P.L.C.

(57) ABSTRACT

An efficient, yet durable wind turbine is provided for use in windy environments even with extreme wind conditions. The turbine includes spaced apart frame members rotatably mounted upon a central axle for rotation therewith, and having a plurality of blades rotatably mounted between the frame members for rotation upon blade axles. Blade directors automatically orient the blades relative to the wind direction. The turbines are self starting, with the frame members rotating in one direction while the blades rotate in an opposite direction so as to move between perpendicular and parallel orientations relative to the wind stream. In one embodiment, the turbine can be oriented either vertically or horizontally. The central axles can be connected to an electrical generator or, if powered by an engine, can be used to provide torque or propulsion to a mechanical device.

13 Claims, 15 Drawing Sheets

OTHER PUBLICATIONS

U.S. Department of Energy; Energy Efficiency and Renewable Energy; Wind and Hydropower Technologies Program, "How Wind Turbines Work", http://www1.eere.energy.gov/windandhydro/wind_how.html. 5 pages printed Oct. 18, 2007.

Mittal, Neeraj, "Investigation of Performance Characteristics of a Novel VAWT", M.Sc. Thesis, Department of Mechanical Engineering, University of Strathclyde, Glasgow, Scotland (Sep. 2001). 36 pages.

* cited by examiner

WINDMILL WITH PIVOTING BLADES

FIELD OF THE INVENTION

The present invention generally relates to windmills or turbines for generating electricity and/or providing mechanical power for propulsion or other uses.

BACKGROUND OF THE INVENTION

Wind energy as been used for centuries to sail ships, pump water, and grind corn and other grain. In the late 1800's, wind turbines for generating electricity were developed. As fossil fuels became more economical, interest in windmills and wind turbines declined substantially, until the Arab oil embargo in 1973 generated an increased interest in alternative energy sources, including wind energy.

Today, the most common wind turbines for generating electricity are horizontal axis turbines, also known as HAWTs.

Despite substantial growth in the commercialization of HAWTs beginning in the 1990's, one major disadvantage of the HAWT is the need to shut the turbine down when wind speeds exceed a particular value, known as the cutoff speed, for safety purposes, particularly relating to the large blades of the HAWT. The typical cutoff speed ranges between 20-25 meters per second. This limitation of HAWTs makes them unsuitable for storm prone areas.

There are two general classifications or categories of vertical axis wind turbines, VAWTs, namely, drag and lift based designs. In a drag based VAWT, the blade speed rarely exceeds the wind speed. The drag is generally described as the pressure or the thrust on the turbine blades created by the wind as the blades pass through the wind. Drag based VAWTs have relatively higher starting torque and less rotational speed than lift based VAWTs. Drag based VAWTs are generally unsuitable for producing electricity due to the low speed, but are useful for grain grinding, pumping water, and other high torque propulsion applications. One major advantage of the drag based VAWT is the ability to self start.

Lift based VAWTs rely on aerodynamics. Lift based VAWTs have a low starting torque, but high rotational speed, so as to be suitable for generating electricity, but normally are not self-starting.

VAWTs have had limited commercial success, primarily by the manufacture of the machine by Flow Wind, which went bankrupt in 1997. Such VAWTs were inferior and less efficient than HAWTs, and therefore have been substantially abandoned in the marketplace. Variations of the Darrieus VAWT include the giromill, which has straight vertical blades, and a cycloturbine, which uses a wind vane to mechanically orient the blade relative to the wind. Other types of VAWTs utilize ducts and/or vortex generation towers, with shrouds or diffusers to deflect the horizontal wind stream to a vertical stream with increased speed.

HAWTs and VAWTs have advantages and disadvantages as compared to one another. A VAWT is traditionally omni-directional, in that it does not need to be turned into the wind as the wind changes direction, as with a HAWT. Thus, a VAWT does not require the yaw mechanism required by a conventional upwind HAWT for proper orientation into the wind. HAWTs also are normally mounted on a high tower to take advantage of higher wind speeds at increased elevations, as compared to wind speed at the ground level. VAWTs are normally placed near the ground, which allow the heavy gear box, generator and control mechanism to be positioned on the ground, thereby permitting easier erection and accessibility for maintenance. The height of HAWTs also create a more pronounced visual impact on the surroundings, while the lower height VAWTs are considered to be more friendly to the visual environment. The blades of a VAWT are not subjected to stresses due to vertical wind velocity gradients and gravitational forces during rotation. In comparison, HAWT blades, which may be 100 feet long, pass through a vertical wind gradient with increased wind speeds atop of the blade path, as compared to the bottom of the blade path. HAWT blades also are subjected to loading due to gravitational forces as the blades move upward and downward in their circular path. Thus, the HAWT blades and blade roots are subject to low cyclic fatigue, which has a bearing on cost and longevity. VAWT blades normally are less expensive and have a longer life expectancy than HAWT blades. HAWT blades are also subject to cantilever loads resulting in bending moments at the blade roots. In comparison, VAWT blades balance centrifugal loads by pre-tension forces in the blades, thereby avoiding bending moments, with the turbine shaft carrying axial and torsion loads only.

Since VAWTs are normally mounted closer to the ground than HAWTs, VAWTs are subject to less wind speed and more turbulence caused by ground sheer. Therefore, for a given rotor size and weight, the VAWT output power is less than that of a HAWT. VAWTs also normally required guy cables for support, which increases the footprint size. The torque and power output of a VAWT fluctuates in a cyclic manner during each revolution as the blades move into and out of the wind, whereas the torque and power output of a HAWT is relatively steady. The cyclic torque variations in the VAWT creates natural vibration frequencies which must be avoided to prevent resonance damage to the motor. HAWTs generally have no vibration problems.

Giromills, which never progressed beyond the research stages, and cycloturbines which had limited commercial success, both were normally placed upon high towers, as compared to the Darrieus VAWT which did not include a high tower. In a cycloturbine, the blades are mounted so that they rotate around their vertical axis, such that the blades can be pitched for an angle of attack relative to the wind. The cycloturbine generates the relatively constant torque. The cycloturbine is capable of self starting by pitching the one blade flat to the wind to generate drag and start the turbine spinning at a low speed. However, the blade pitching mechanism is relatively complex and generally heavy.

Accordingly, a primary objective of the present invention is the provision of an improved wind turbine for generating electricity and/or providing mechanical energy.

Another objective of the present invention is the provision of a windmill having multiple blades which rotate upon a blade axis as the turbine rotates about a turbine axis.

Another objective of the present invention is the provision of a wind turbine which can be oriented horizontally or vertically.

Still another objective of the present invention is the provision of a wind turbine having a simple blade pitch adjustment mechanism.

A further objective of the present invention is the provision of a windmill having a fan tail to automatically direct or control the orientation of the blades relative to the wind as the turbine rotates.

Another objective of the present invention is the provision of a windmill having a plurality of rotatable blades and a plurality of blade directors, with one director being associated with each blade, so as to orient the blade relative to the wind.

A further objective of the present invention is the provision of a windmill having a frame which rotates in one direction and blades which rotate in the opposite direction.

Another objective of the present invention is the provision of a windmill which is economical to manufacture, and efficient and durable in use.

These and other objectives will become apparent from the following description of the invention.

BRIEF SUMMARY OF THE INVENTION

Two embodiments of a windmill or turbine are disclosed. In one embodiment, the windmill includes a central axle with a frame mounted to the axle. First and second blades are rotatably mounted on the frame on opposite sides of the axle. Intermeshing gears or sprockets interconnect the frame axle with the blade axles. A fan tail on the frame axle automatically directs one of the blades into the wind as the frame rotates. The frame rotates in one direction, while the blades rotate in an opposite direction. The angular rotation of the blades is one-half the angular rotation of the frame, such that each 360° rotation of the frame yields a 180° rotation of the blades. The frame and blade axles are oriented vertically.

In a second embodiment, a rotatable frame is mounted on a central pivot axis. A plurality of rotatable blades are pivotally mounted to the frame radially outwardly from the central pivot axis. A plurality of blade directors, such as a fan tail or a weight, are provided on the frame, with one director being associated with each blade so as to orient the blade relative to the wind. The wind rotates the frame and blades in opposite directions. The second embodiment can be oriented vertically or horizontally.

DETAILED DESCRIPTION OF THE PREFERRED EMBODIMENT

Figure 1:
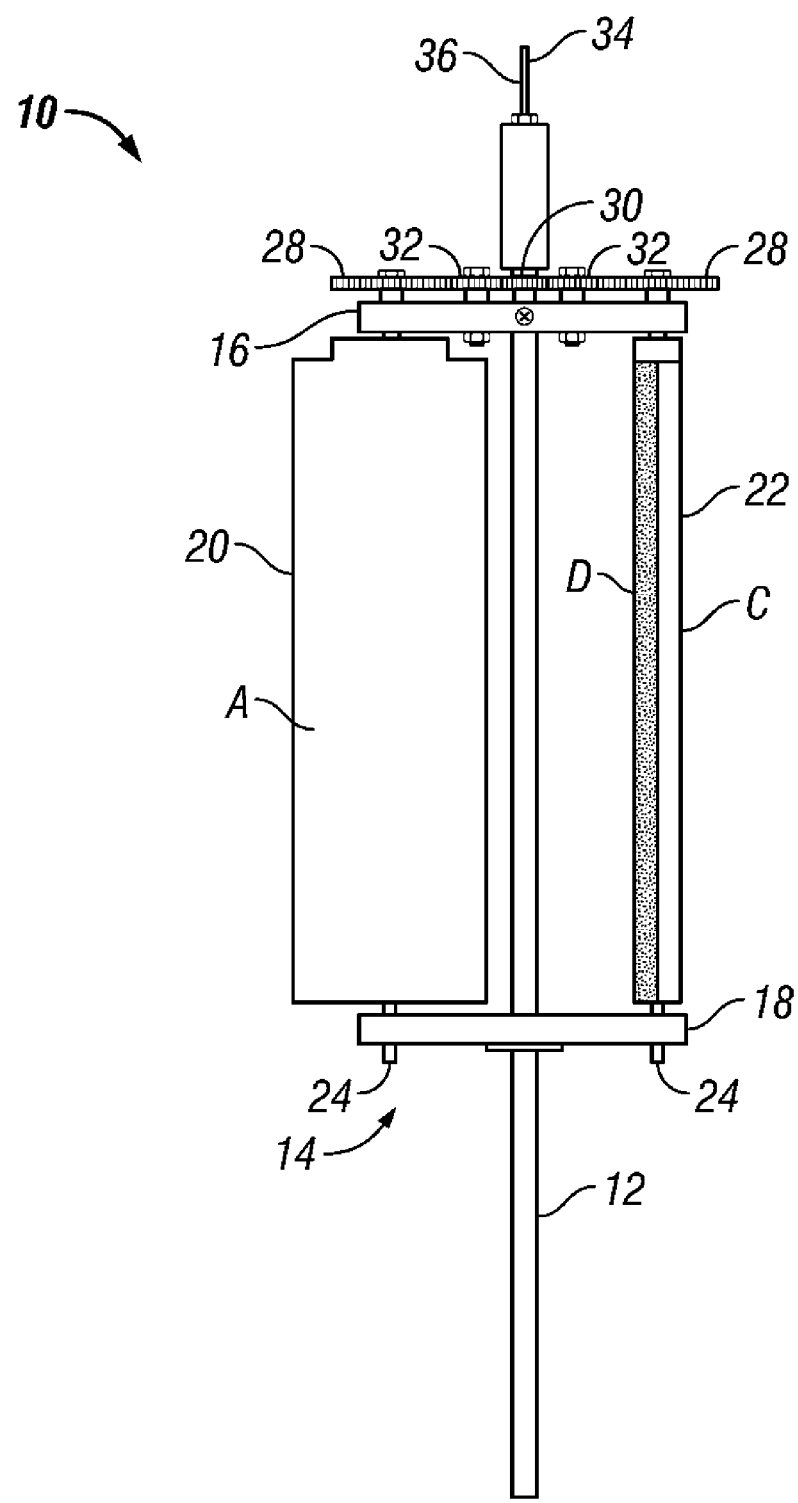
FIG. 1 is a side elevation view of the first embodiment of the windmill or wind turbine of the present invention, with the blades oriented in an initial position.

The first embodiment of the wind assembly of the present invention is generally designated in FIGS. 1-16 with reference numeral 10. The wind assembly 10 is typically in the form of a windmill or wind turbine. The turbine 10 includes a central axle 12 upon which is mounted a frame 14 comprising an upper frame member 16 and a lower frame member 18. The first and second blades 20, 22 are mounted on axles 24, which extend between the upper and lower frame members 16, 18 such that the blades 20, 22 are rotatable relative to the frame 14. Each blade axle 24 has an upper sprocket or gear 28. The main axle 12 also has an upper sprocket or gear 30. Intermediate gears 32 mesh with the frame gear 30 and the blade gears 28 such that rotation of the frame 14 upon the axle 12 in one direction automatically rotates the blades 20, 22 on the axles 24 in the opposite direction. The blade gears 28 are larger than the frame gear 30, such that the blades rotate at half the speed of the frame. Thus, each 360° rotation of the frame 14 imparts a 180° rotation to the blades 20, 22.

As seen in FIGS. 1-16, blade 20 has opposite faces A, B and blade 22 has opposite faces C and D. FIGS. 1-4 illustrate one revolution of the frame 14. As seen in the figures, the blades 20, 22 are oriented 90° with respect to one another. Therefore, in FIG. 1, with the frame in an initial position, the face A of the blade 20 is perpendicular to the wind direction, while the faces C, D of the blade 22 are parallel with the wind direction such that the leading edge of the blade 22 is cutting into the wind.

Figure 2:
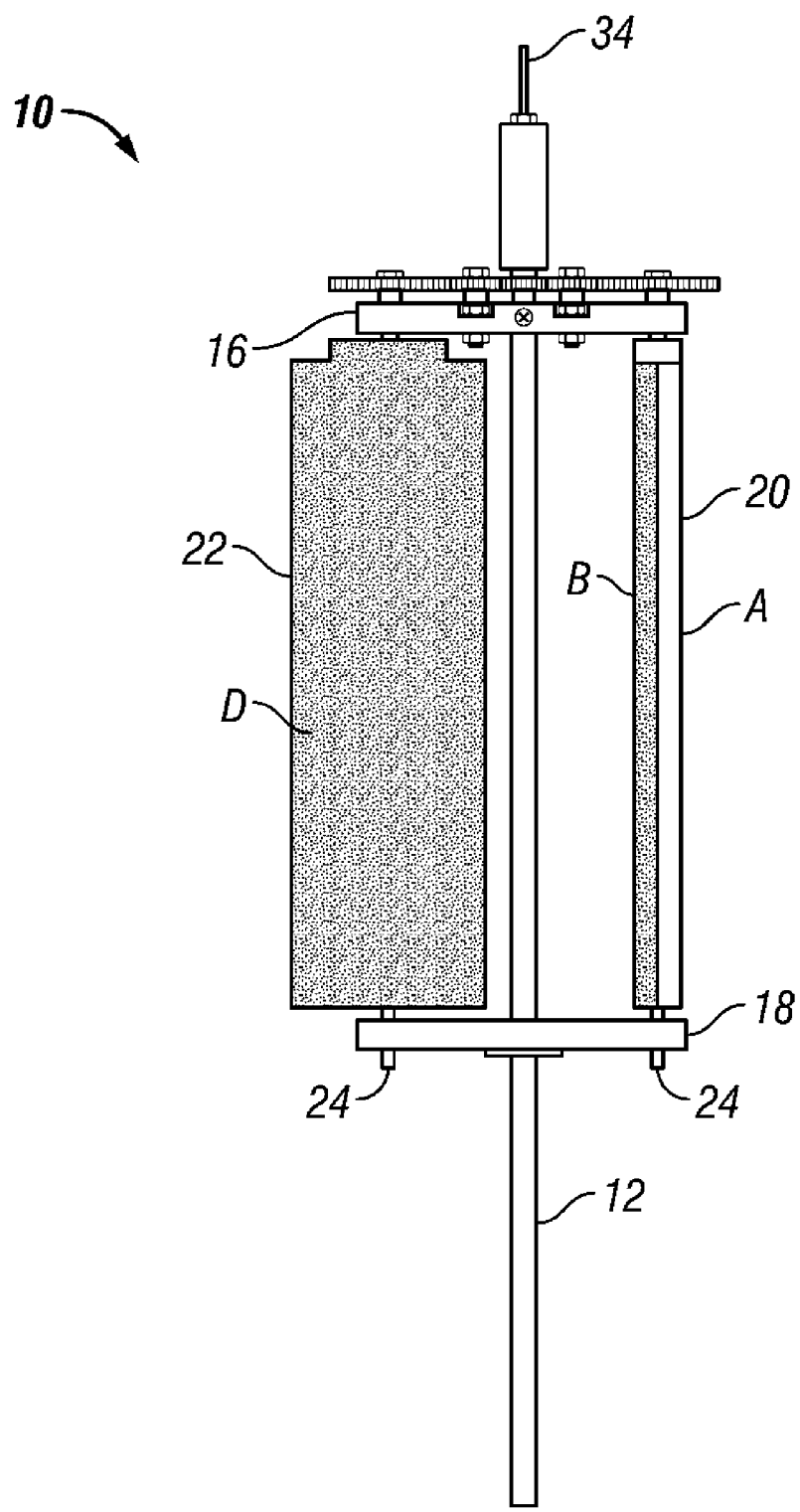
FIG. 2 is a view similar to FIG. 1 showing the frame rotated 180° and the blades rotated 90°.

FIG. 2 shows the frame rotated 180° such that the face D of the blade 22 is perpendicular to the wind stream, while the faces A, B of the blade 20 are parallel to the wind stream.

Figure 3:
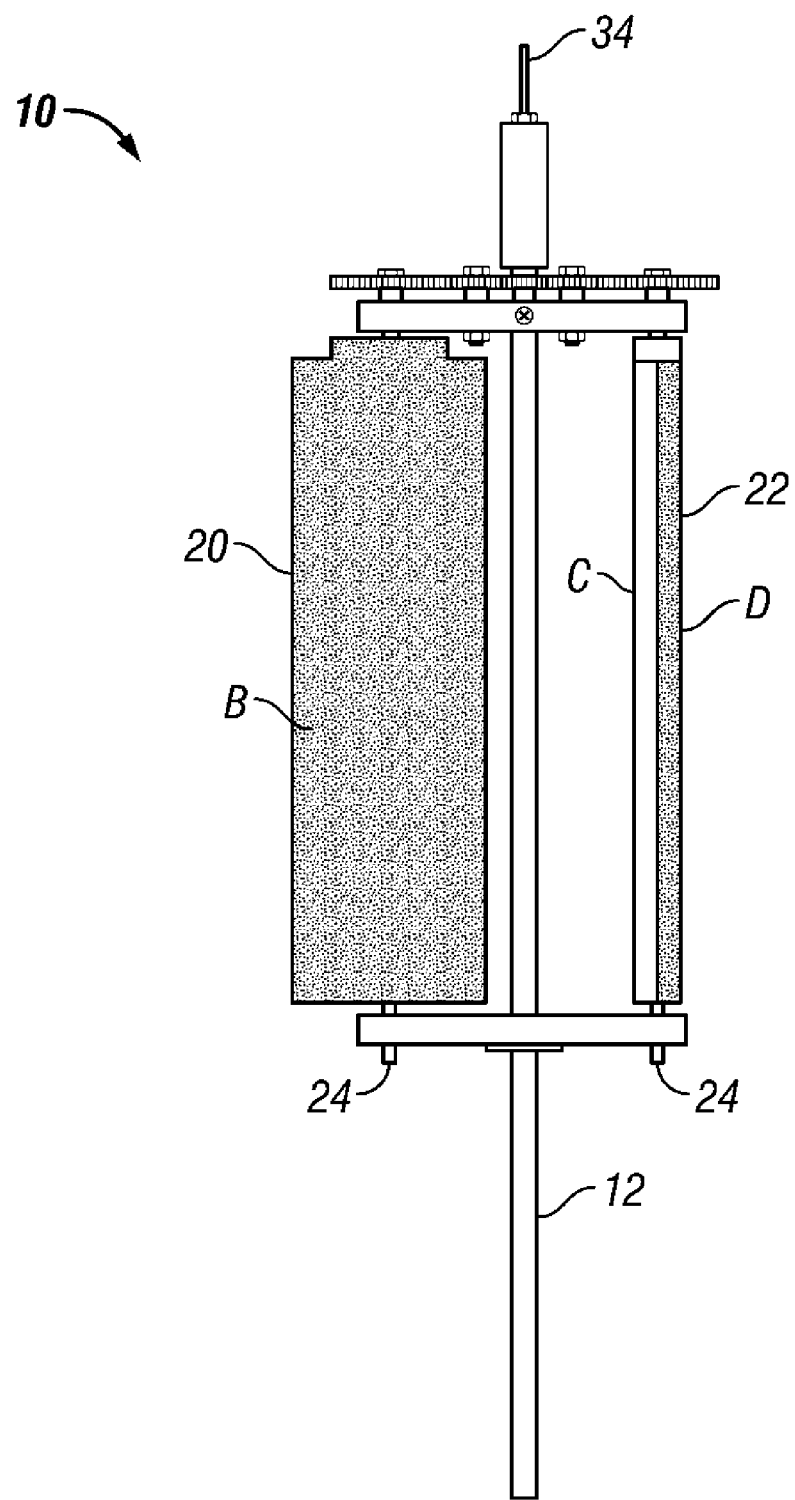
FIG. 3 is a view similar to FIG. 2, showing the frame rotated another 180°, and the blades rotates another 90°.

FIG. 3 shows another 180° rotation of the frame 14, such that the face B of the blade 20 is facing the wind with the blade 22 oriented parallel to the wind stream so as to cut into the wind.

Figure 4:
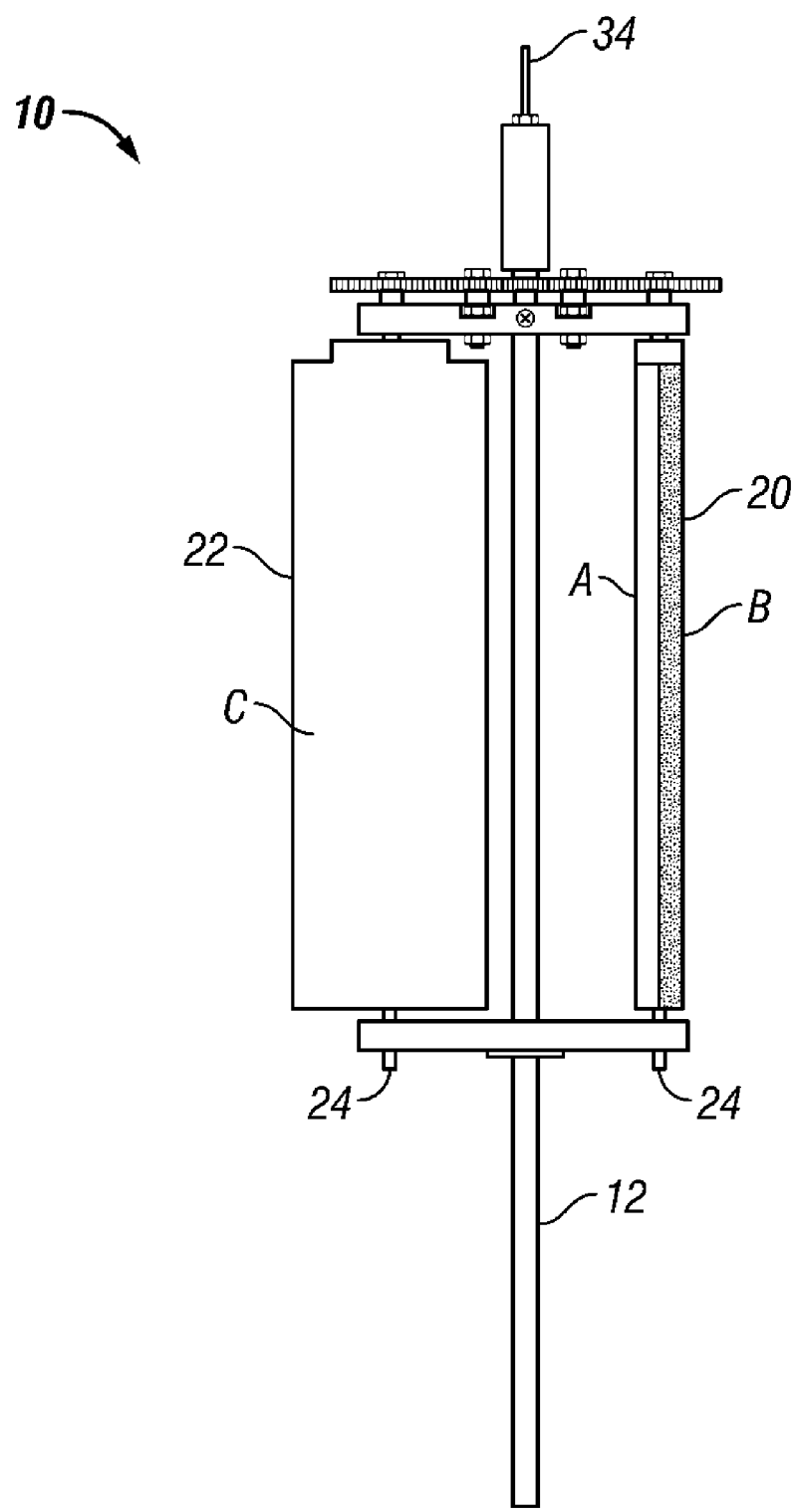
FIG. 4 is a view similar to FIG. 3, showing the frame rotated an additional 180°, and the blades rotated an additional 90°.

FIG. 4 shows a further 180° rotation of the frame 14, such that the face C of the blade 22 faces the wind and blade 20 cuts into the wind. Another 180° rotation of the frame will move the blades to the position shown in FIG. 1.

Figure 5:
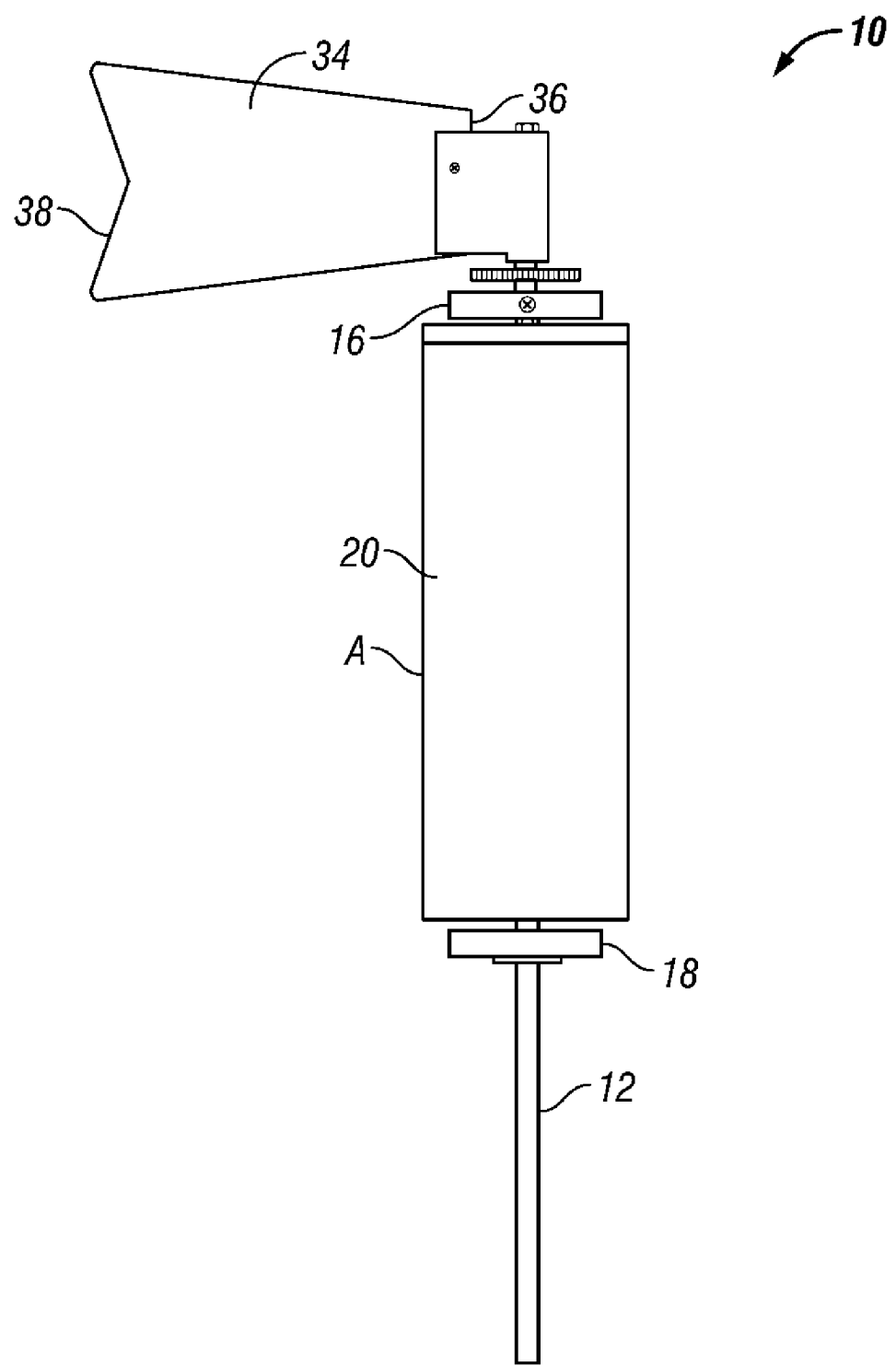
FIG. 5 is a view similar to FIG. 1 with the fan tail and frame rotated 90° and each of the blades rotated 45°.
Figure 6:
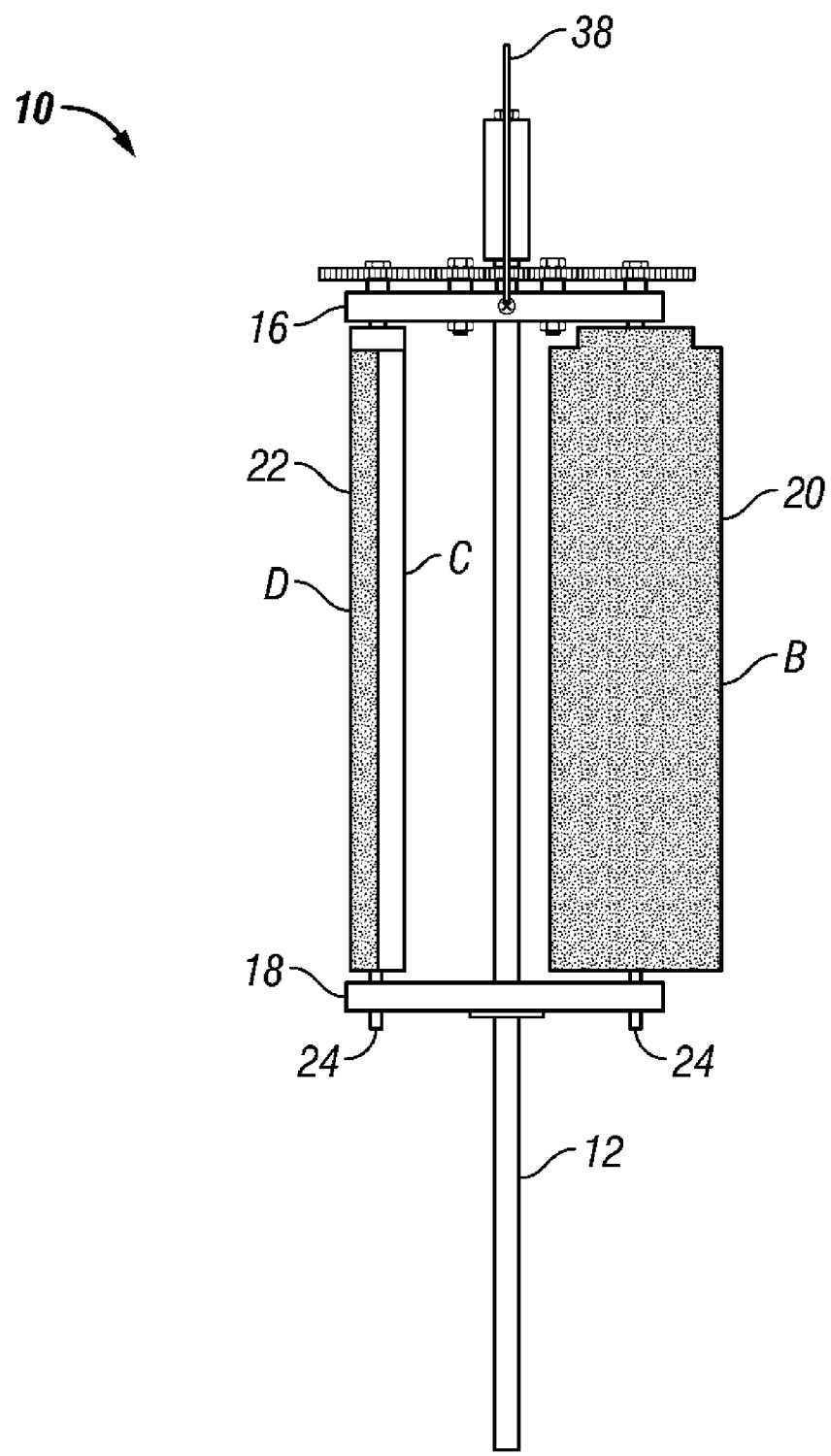
FIG. 6 is a view similar to FIG. 5, with the fan tail and frame rotated another 90°, and the blades rotated another 45°.
Figure 7:
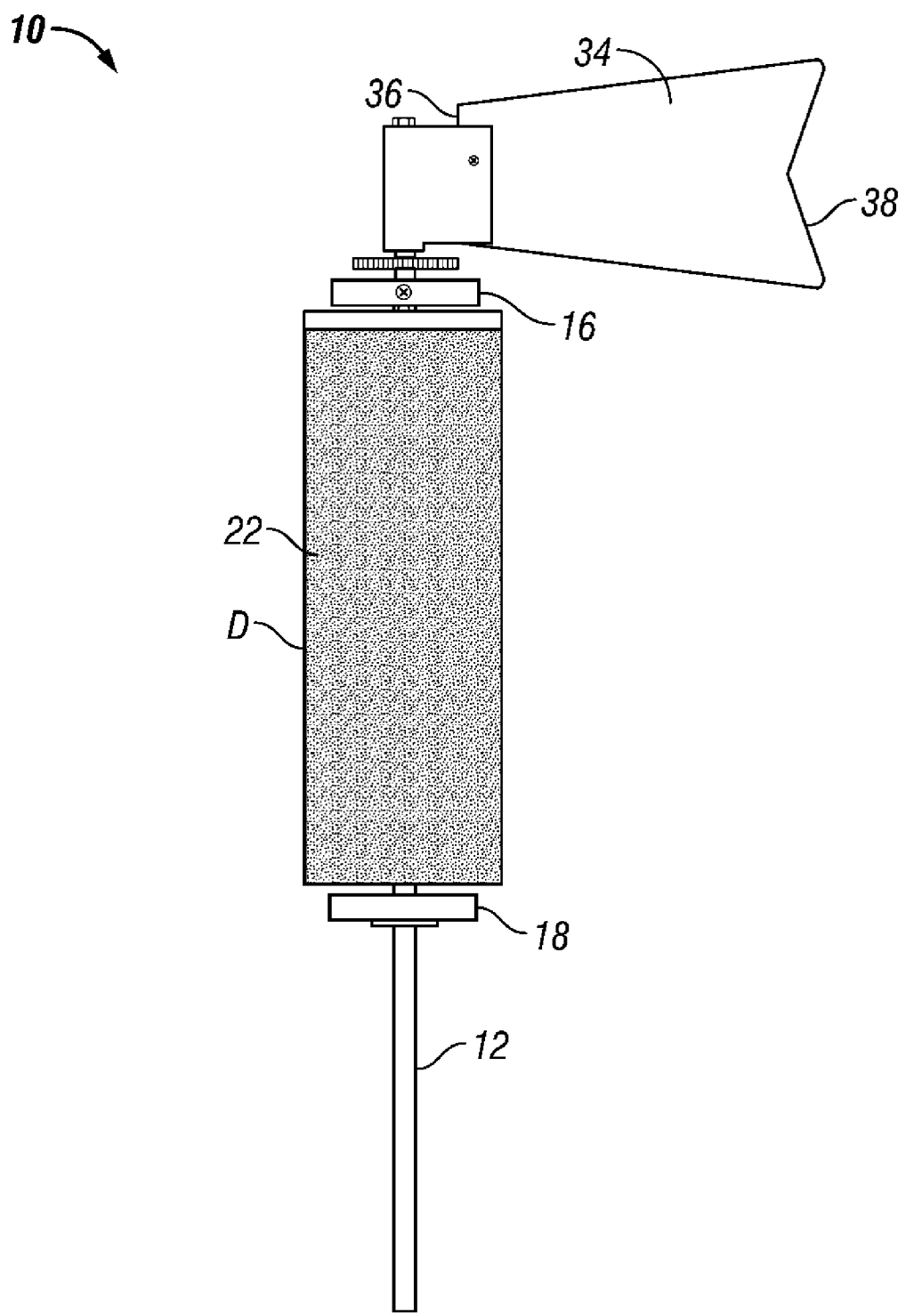
FIG. 7 is a view similar to FIG. 5 showing the fan tail and frame rotated another 90°, and the blades rotated another 45°.
Figure 8:
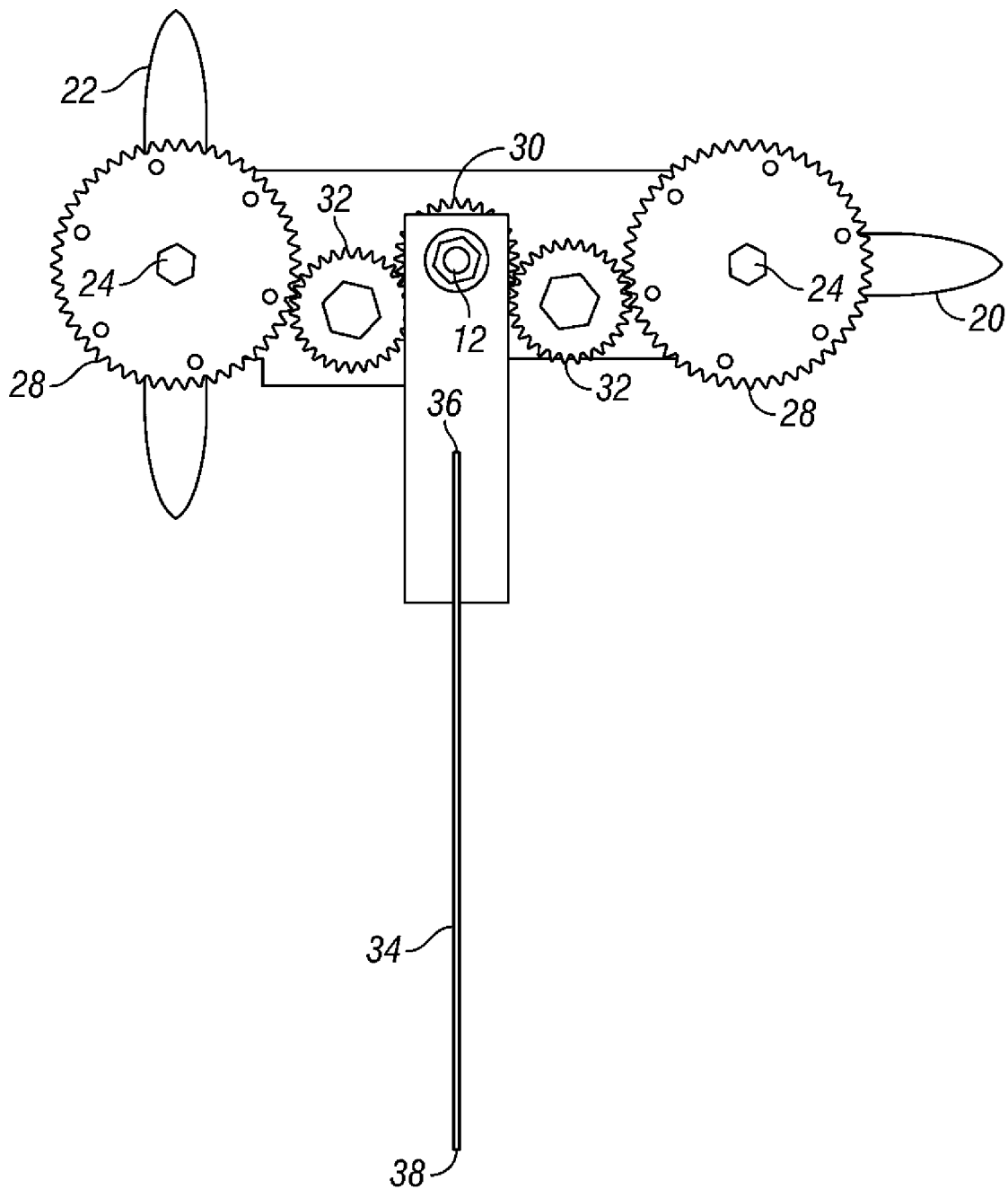
FIG. 8 is a top elevation view of the windmill or turbine shown in FIG. 1.

A fan tail 34 is mounted on the frame axle 12, such that when there is a change in the wind direction, the fan tail 34 rotates the blades 20, 22 into an orientation such as shown in FIG. 1 with the leading edge 36 of the fan tail directed into the wind and the rear edge 38 trailing the leading edge 36. In FIG. 1, the wind is blowing perpendicular to face A of the blade 20, for example, from the South. In FIG. 5, the wind has shifted 90° so as to be blowing from the East. FIG. 6 shows a further change in wind direction with the wind coming out of the North, which further rotates the blades another 45°. FIG. 7 illustrates the wind blowing from the West, with the frame 14 rotated an additional 90° and the blades rotated an additional 45°.

Figure 9:
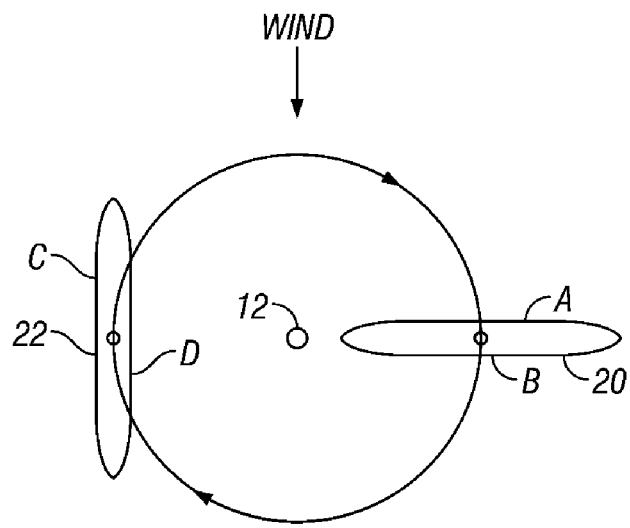
FIGS. 9-16 are schematic top elevation views showing the relative orientation of the blades as the frame rotates 720°.
Figure 10:
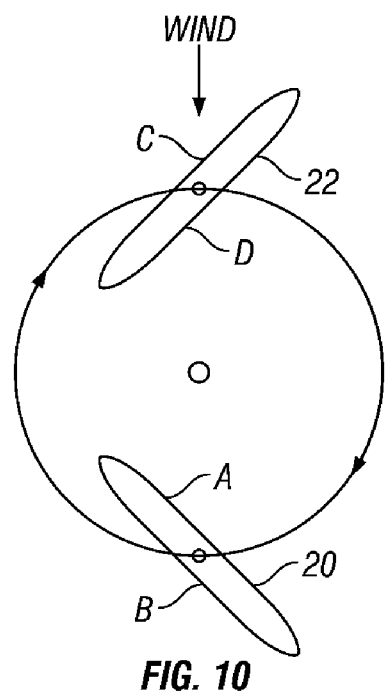
Figure 11:
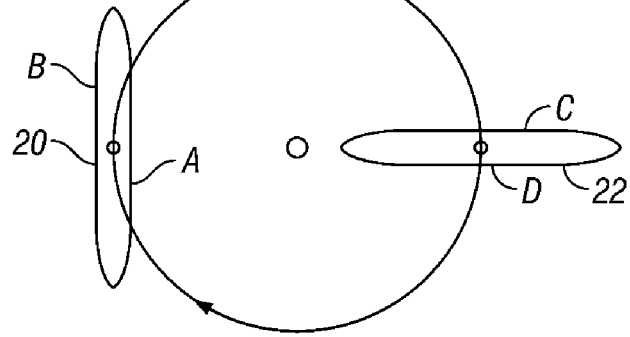
Figure 12:
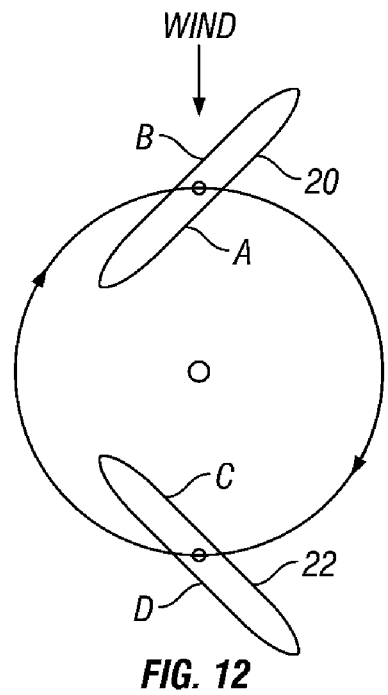
Figure 13:
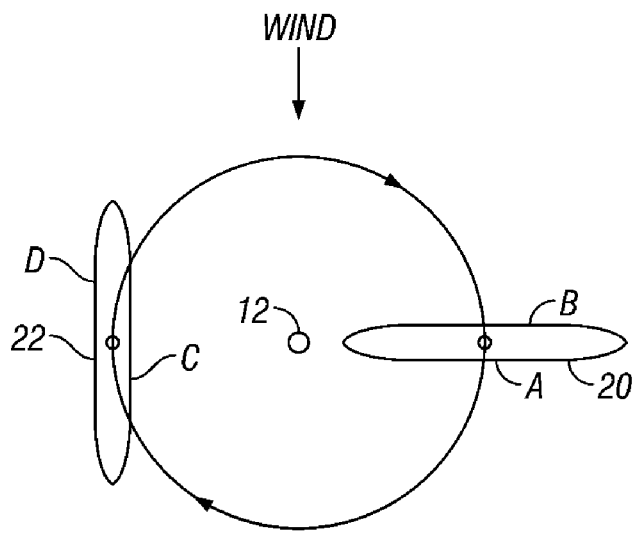
Figure 14:
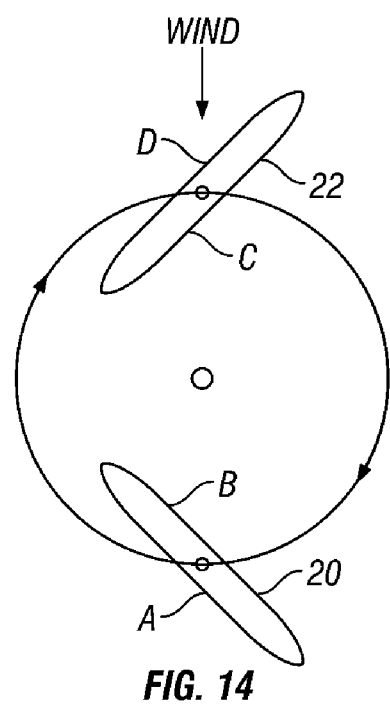
Figure 15:
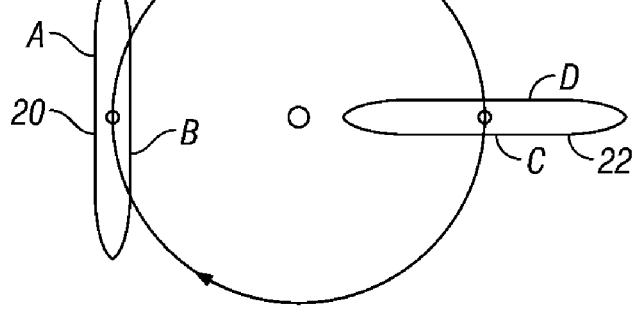
Figure 16:
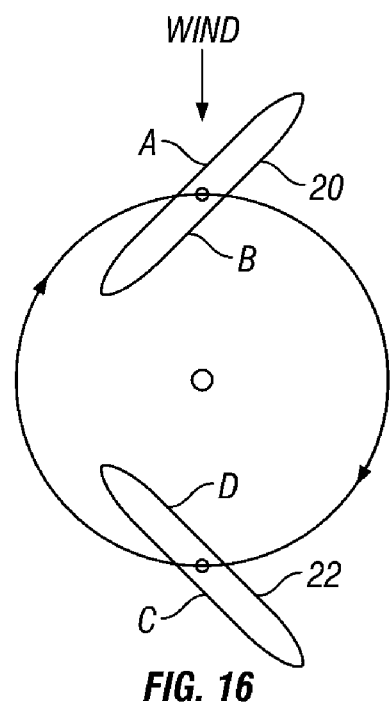

FIGS. 9-16 schematically show the relative orientation and rotation of the blades 20, 22 as the frame 14 rotates. FIG. 9 shows an initial orientation of the blades relative to the wind, with each successive figure showing the position of the blades when the frame 14 has rotated another 180°. Thus, as the frame 14 rotates 720° from FIG. 9 to FIG. 16, each blade 20, 22 rotates 360° about the blade axles 24.

Figure 17:
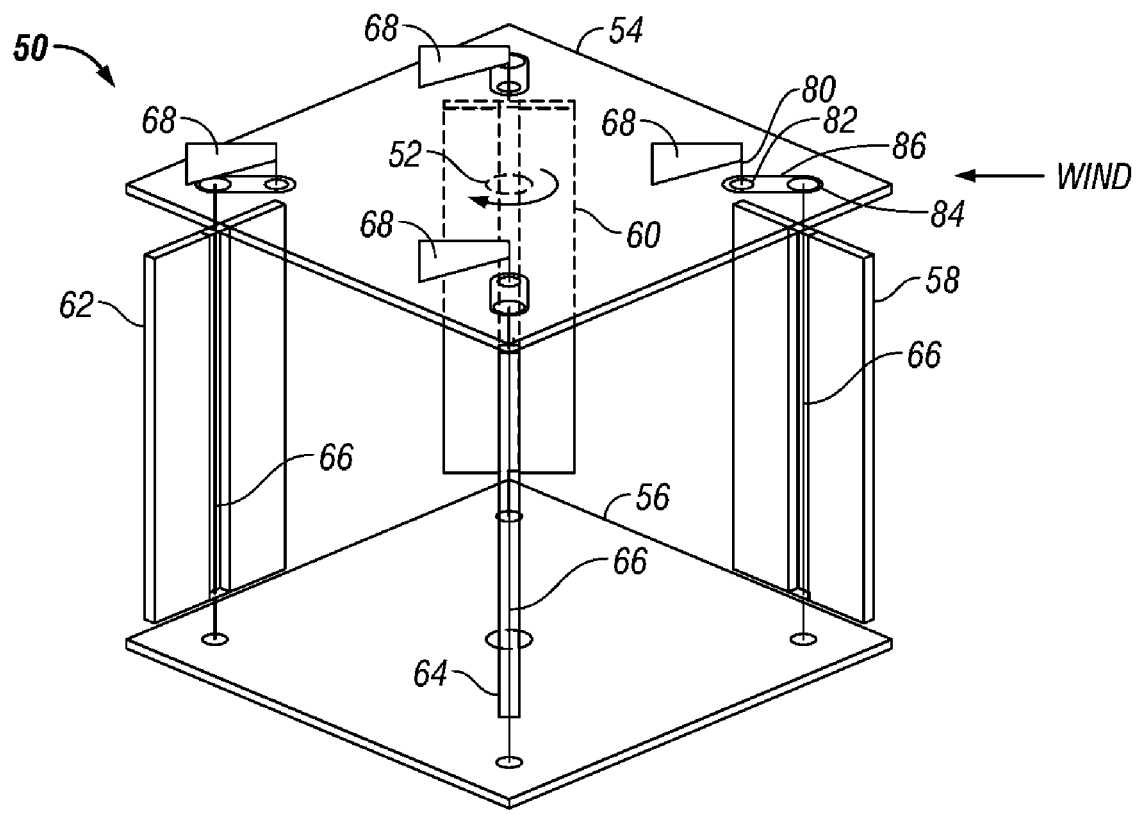
FIG. 17 is a perspective view of the second embodiment of the windmill/turbine of the present invention in a vertical orientation.
Figure 18:
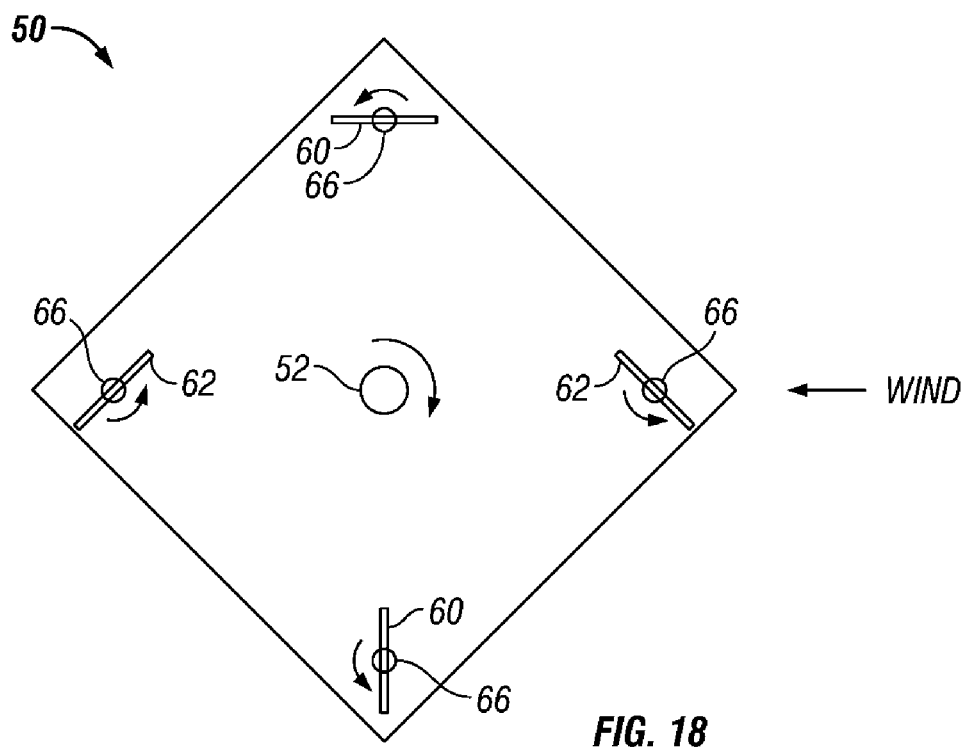
FIG. 18 is a schematic top elevation view showing relative orientation of the blades of the second embodiment.
Figure 19:
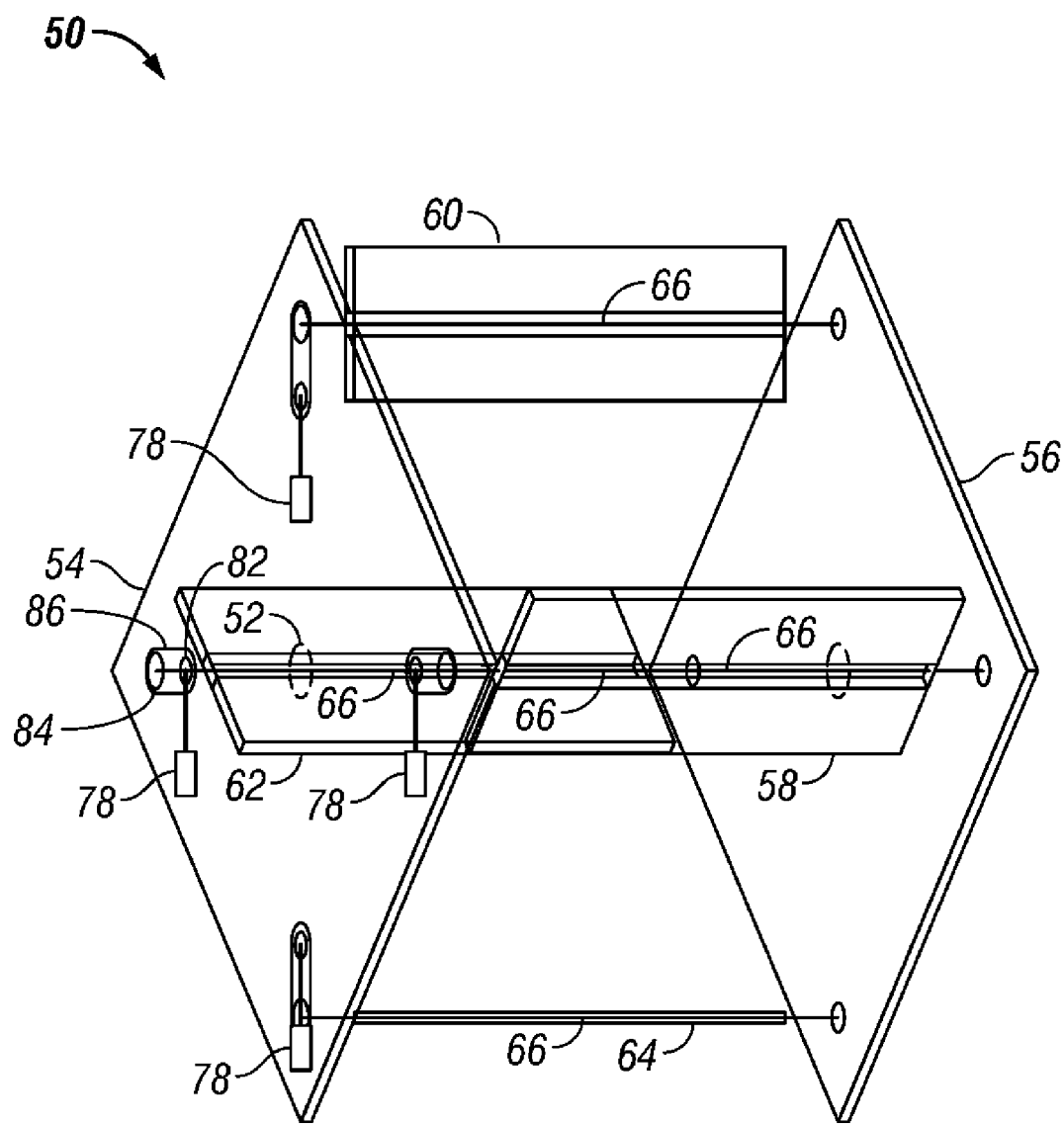
FIG. 19 is a perspective of the second embodiment in a horizontal orientation.
Figure 20:
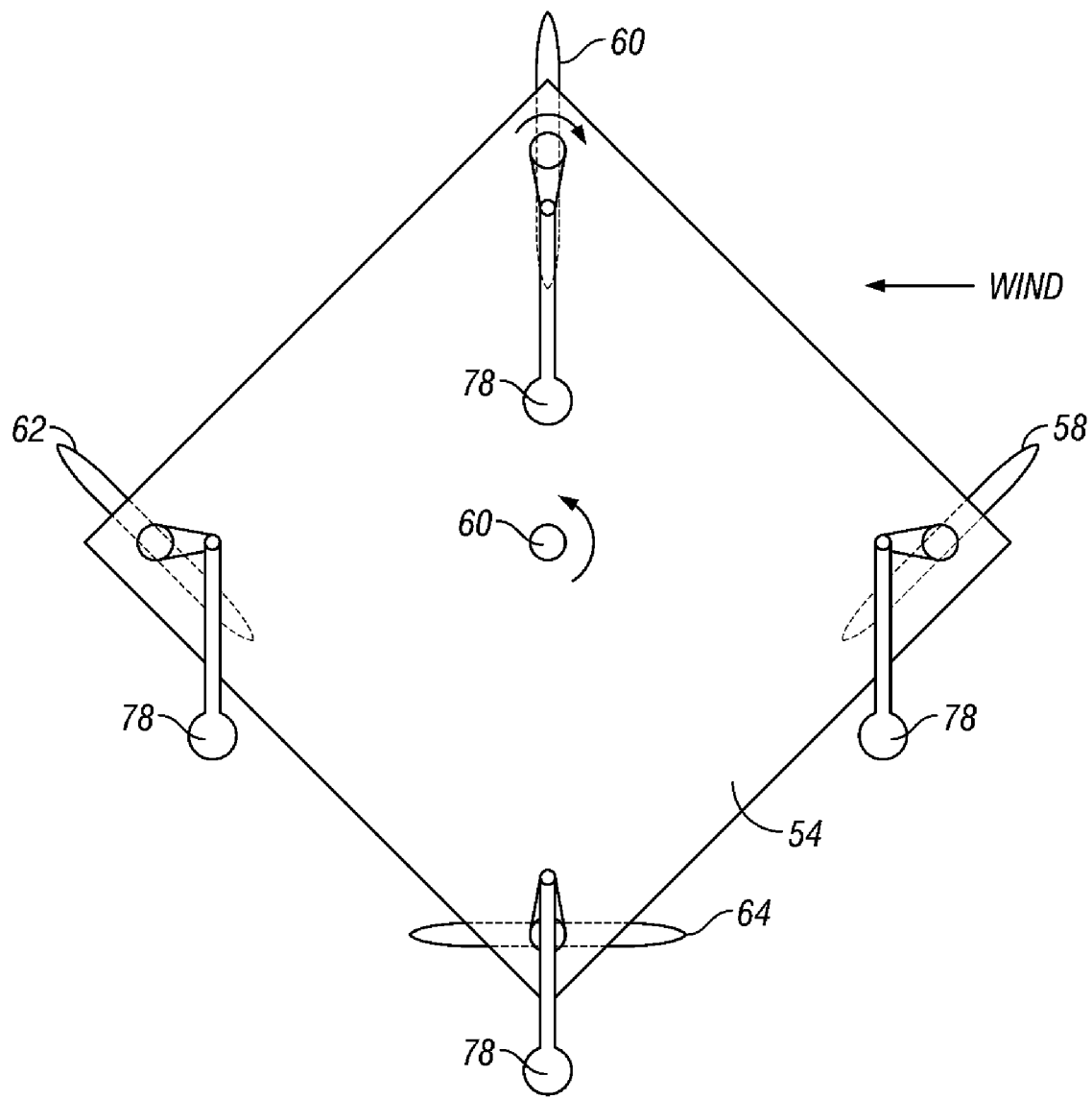
FIG. 20 is an end elevation view of the second embodiment in a horizontal orientation.
Figure 21:
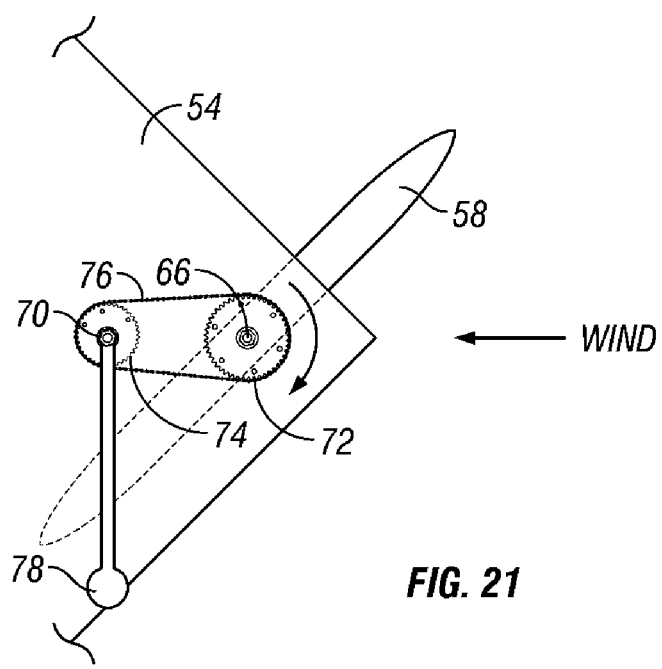
FIG. 21 is an enlarged plan view showing the blade rotational drive system of the second embodiment.
Figure 22:
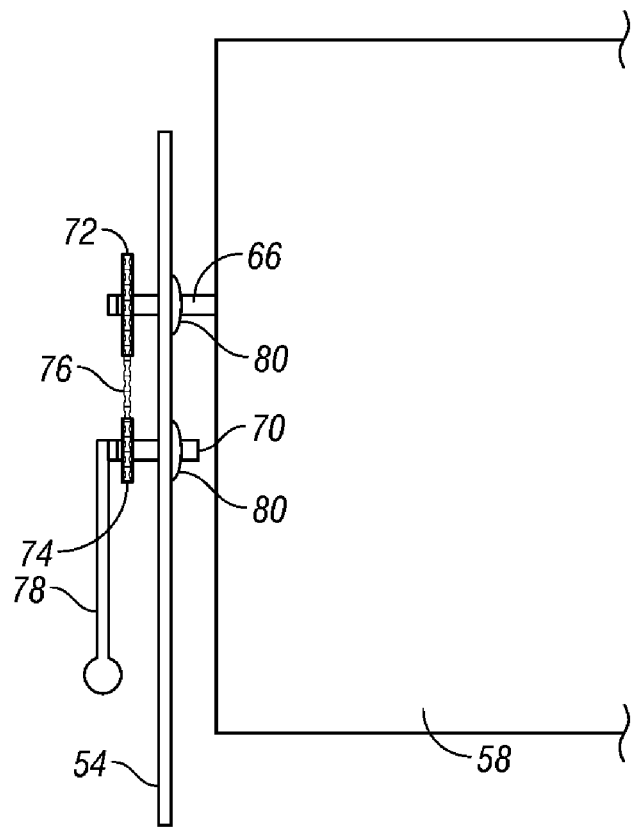
FIG. 22 is an enlarged elevation view of the blade rotational drive system of the second embodiment.

A second embodiment of the windmill/turbine is shown in FIGS. 17-19, and is generally designated by the reference numeral 50. The turbine 50 includes a central axle 12 upon which are mounted upper and lower frame members 54, 56. A plurality of blades or paddles 58, 60, 62, 64 is mounted upon axles 66 rotatably supported at opposite ends between the frame members 54, 56. Thus, the blades 58, 60, 62, 64 are rotatable relative to the frame members 54, 56. The turbine 50 can be oriented vertically, as shown in FIG. 17, or horizontally, as shown in FIG. 19. In each orientation, blade directors are provided so as to position the blades relative to the wind and relative to the rotation of the frame members 54, 56. For example, in a vertical orientation as shown in FIGS. 17 and 18, the blade directors are in the form of fan tails 68 associated with each of the blades 58, 60, 62 and 64. Each of the fan tails 68 is rotatably mounted upon an axle 70. As best seen in FIGS. 21 and 22, a sprocket 72 is provided on each blade axle 66, and a sprocket 74 is provided on each fan tail axle 70. A drive chain or gear or sprocket 76 extends around the associated sprockets 72, 74. Bearings 80 are provided for rotational support of the axles 66, 70. The fan tail 68 of the turbine 50 functions similarly to the fan tail 34 of the turbine 10 so as to rotate the blades 58-64 as the frame members 54, 56 rotate, so that the faces of the blades rotate relative to the wind stream so as to be perpendicular or parallel thereto. If the wind changes direction, the fan tails 68 rotate as describe above with respect to the fan tail 34 so as to reposition the associated blades relative to the wind direction.

When the turbine 50 is oriented horizontally, as shown in FIG. 19, the fan tails 68 are replaced with weights 78 which always hang downwardly, regardless of the wind direction. As the turbine frame members 54, 56 rotate, the drive trains formed by the sprockets 72, 74 and associated chain 76 rotate the blades 58, 64 so that the faces thereof are perpendicular or parallel to the wind stream, so as to function similarly as described above relative to the turbine 10. The horizontal orientation of the turbine 50 functions the most efficiently when the wind direction is parallel to the surfaces of the frame members 54, 56.

Figure 23:
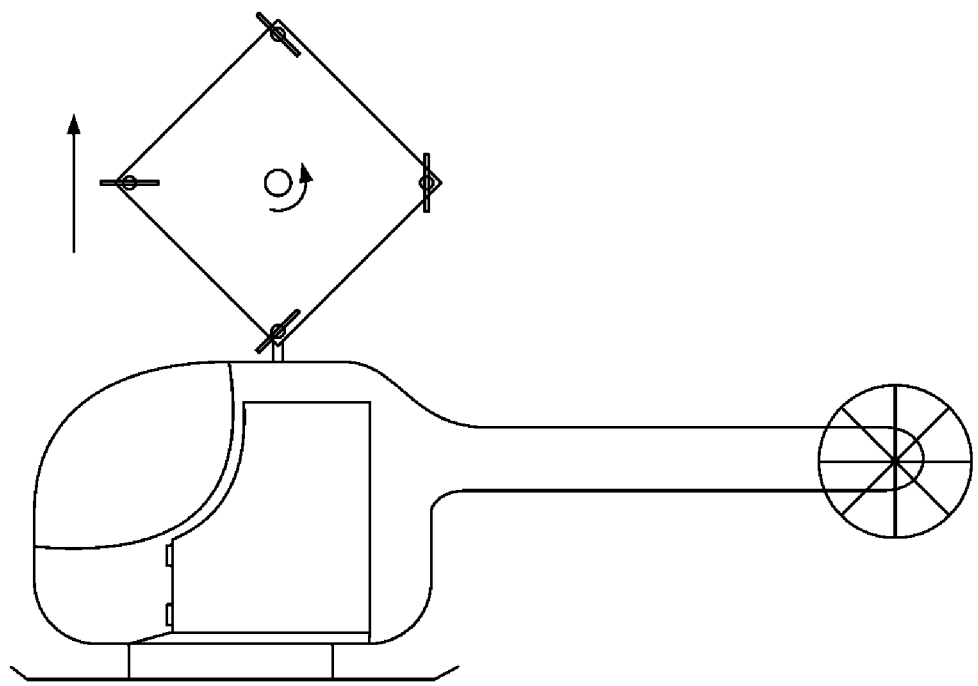
FIGS. 23 and 24 are schematic views showing use of the invention for lifting a propelling vehicle, respectively.
Figure 24:
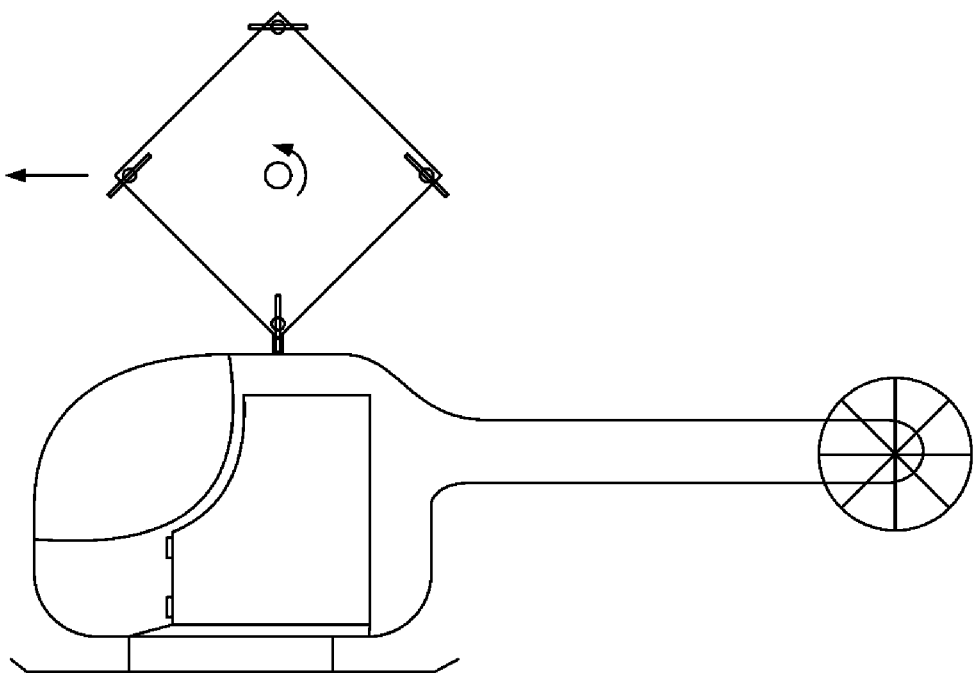

It is understood that the axles 12, 52 of the turbines 10, 50 are operatively connected to an electrical generator (not shown) or to a mechanical machine, tool or device requiring torque, such as a water pump or a grain grinder. The wind assembly 10 is also used for propulsion, for example in a helicopter, plane or boat. In one orientation, the blades of the assembly 10 can provide lift as seen in FIG. 23, and then re-oriented to provide propulsion to the craft or vehicle, as seen in FIG. 24.

It is further understood that the blade directors, such as the fan tails 68 or the weights 78 can be eliminated and replaced with electronic controls or electro-magnetic controls to rotate the blades. For example, orientation of the blades can be controlled by an electric motor operatively connected to a respective blade axle or gear. A sending unit may be connected to each fan or weight to govern the motor for each blade.

The windmills or turbines 10, 50 are self starting. Since the blades are supported by frame members at the opposite ends, the turbines 10, 50 are durable so as to withstand high wind speeds and shear. Thus, the turbines 10, 50 can be used on ground level, or at elevations high above the ground.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A windmill, comprising:
   a horizontal axle;
   a frame mounted on the axle;
   first and second blades rotatably mounted on the frame on opposite sides of the axle;
   first and second weights connected to the first and second blades, respectively, to automatically direct the blades relative to the wind;
   first and second drive assemblies interconnecting the first and second weights with the first and second blades, respectively, so as to rotate the blades; and
   wherein the angular rotation of the blades is ½ the angular rotation of the frame.

2. The windmill of claim 1 wherein the frame rotates in a first direction and the blades rotate in an opposite direction.

3. A windmill, comprising:
   a horizontal axle;
   a frame mounted on the axle;
   first and second blades rotatably mounted on the frame on opposite sides of the axle;
   first and second weights connected to the first and second blades, respectively, to automatically direct the blades relative to the wind;
   first and second drive assemblies interconnecting the first and second weights with the first and second blades, respectively, so as to rotate the blades; and
   wherein the blades rotate 180° for each 360° rotation of the frame.

4. A windmill, comprising:
   a horizontal axle;
   a frame mounted on the axle;
   first and second blades rotatably mounted on the frame on opposite sides of the axle;
   first and second weights connected to the first and second blades, respectively, to automatically direct the blades relative to the wind;
   first and second drive assemblies interconnecting the first and second weights with the first and second blades, respectively, so as to rotate the blades; and
   wherein the blades are offset 180° relative to one another.

5. A windmill, comprising:
   a horizontal axle;
   a frame mounted on the axle;
   first and second blades rotatably mounted on the frame on opposite sides of the axle;
   first and second weights connected to the first and second blades, respectively, to automatically direct the blades relative to the wind;
   first and second drive assemblies interconnecting the first and second weights with the first and second blades, respectively, so as to rotate the blades; and
   wherein the frame includes first and second frame members between which the blades reside.

6. A wind turbine, comprising:
   a rotatable frame having a central pivot axis;
   a plurality of rotatable blades pivotally mounted to the frame radially outwardly from the central pivot axis;
   a plurality of blade directors, one associated with each blade to orient the blade relative to the wind;
   a drive assembly extending between each blade director and the associated blade; whereby wind impacting the blades rotates the frame and blades in opposite directions; and
   wherein the central pivot axis is horizontal and the blade directors are weights.

7. The wind turbine of claim 6 wherein each blade director is mounted on an axle and each blade is mounted on an axle, the axles being parallel and spaced apart.

8. The wind turbine of claim 6 wherein the frame and blades rotate at different speeds.

9. The wind turbine of claim 6 wherein the assembly includes four blades located 90° from one another.

10. A wind assembly, comprising:
- a rotatable frame axle oriented horizontally;
- a frame on the axle;
- a rotatable blade axle on the frame;
- a blade on the blade axle for rotation relative to the frame;
- a gravitational blade director connected to the blade axle to orient the blade relative to the wind due to gravity and regardless of wind direction;
- gears interconnecting the blade director and blade to automatically position the blade relative to the wind; and
- whereby the frame and blade rotate in the wind in opposite directions.

11. The windmill assembly of claim 10 further comprising a second rotatable blade axle and blade on the frame, with the blades being located on opposite sides of the frame axle and being offset 180° relative to one another.

12. A windmill, comprising:
- a horizontal axle;
- a frame mounted on the axle;
- first and second blades rotatably mounted on the frame on opposite sides of the axle;
- first and second weights connected to the first and second blades, respectively, to automatically direct the blades relative to the wind; and
- first and second drive trains interconnecting the first and second weights with the first and second blades, respectively, so as to rotate the blades.

13. The windmill of claim 12 wherein the drive trains each include a sprocket and chain assembly.

* * * * *